United States Patent Office 3,307,354
Patented Mar. 7, 1967

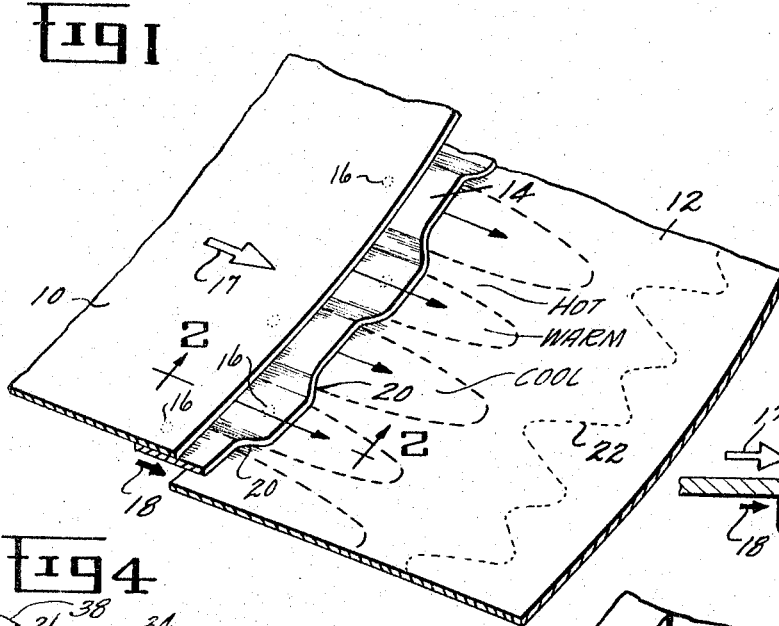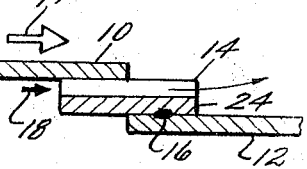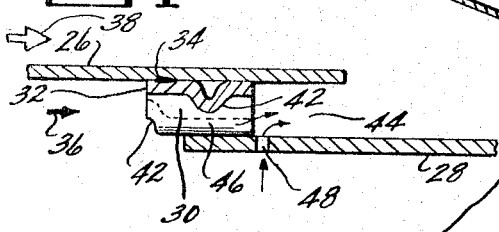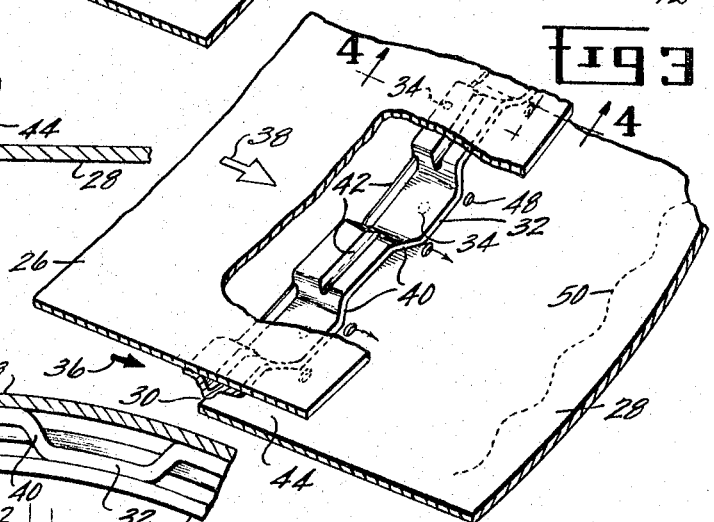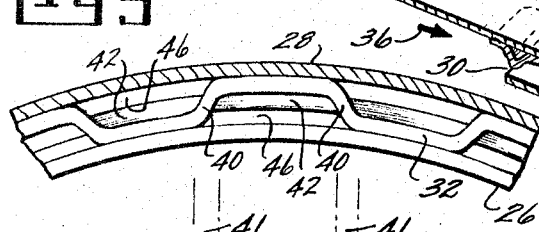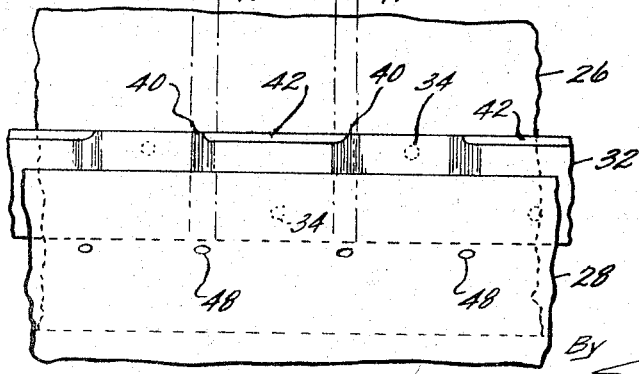

3,307,354
COOLING STRUCTURE FOR
OVERLAPPED PANELS
Robert W. Macaulay, Cincinnati, Edward Ekstedt, Montgomery, and Thomas C. Campbell, Cincinnati, Ohio, assignors to General Electric Company, a corporation of New York
Filed Oct. 1, 1965, Ser. No. 492,153
8 Claims. (Cl. 60—39.66)

The present invention is directed to a cooling structure and, more particularly, to a combustion chamber structure as may be used in gas turbine engines.

For convenience of illustration and discussion, the invention will be described in connection with a jet engine of the gas turbine type. However, it will be appreciated that the structure is suitable for any high temperature application.

In present day aircraft engines, and engines that are planned, it is apparent that higher and higher temperatures will be used. In addition, the time between overhaul (TBO) is being greatly increased to reduce maintenance costs. One of the engine components that is subject to high temperatures and short life is the combustion chamber. The present state of the art on combustors is about 3,000 hours TBO whereas proposed state of the art must be nearly double this time.

Thus, it is necessary that a combustion chamber cooling structure be provided which will operate at much more severe conditions, higher temperatures, and much longer periods of time.

The present combustors are generally annular systems called liners which consist essentially of telescoping rings that overlap one another. The telescoping rings are generally separated by a corrugated strip that is known in the art as a wiggle strip. This corrugated element spaces the parts by virtue of the depth of the corrugations and the thickness of the metal. Generally, the metal thickness of the strip is a fairly substantial proportion of the total spacing. The result is that the cooling air passing between the corrugations is tripped by the step formed by the edge of the metal or the corrugation edge. As a result, the cooling air film does not adhere to the surface which must be cooled and is carried away by the adjacent hot gases permitting non-uniform cooling of the liners. Thus hot and cold gradients are set up which adversely affect the life of the combustor. Further, the cooling film is relatively thin and its heat transfer characteristics relative to the matching gas stream are not as effective as would be the case if the velocity of the cooling air were more matched with the gas stream velocity. Summarized, the state of the art using wiggle strips provides hot and cold spots in the combustors and consequent thermal gradients that are not conducive to long life and an improved design is required.

The main object of the present invention is to provide a combustion chamber construction that ensures uniform temperature distribution and substantially eliminates severe thermal gradients in the structure.

A further object is to provide a combustion chamber construction that is operable under severe conditions for a long period of time.

Another object is to provide such a chamber wherein the construction provides for close matching of the cooling film to the exhaust gas stream velocities.

A further object is to provide such a chamber wherein the cooling fluid quantity is not increased but, by virtue of the construction employed, is more effectively utilized.

An additional object of the invention is to provide such a combustion chamber that employs the corrugated wiggle strips in an improved version including the addition of cooling apertures to avoid the hot wake created by the risers in the corrugated strips.

A further object is to provide such a combustor which is more rigid to reduce buckling.

While the specification concludes with claims particularly pointing out and distinctly claiming the subject matter which is regarded as the invention, it is believed the invention will be better understood from the following description taken in connection with the accompanying drawings, in which:

FIGURE 1 is a partial perspective view of a conventional combustor structure illustrating the thermal gradients;

FIGURE 2 is a partial cross section on line 2—2 of FIGURE 1;

FIGURE 3 is a view similar to FIGURE 1, partially broken away, illustrating the structure of the invention;

FIGURE 4 is a partial cross sectional view, similar to FIGURE 2, on line 4—4 of FIGURE 3;

FIGURE 5 is a partial view looking in on the end of part of FIGURE 4; and

FIGURE 6 is a partial view looking down on the top of FIGURE 5.

Referring first to FIGURE 1, there is shown a structure that may be part of a combustion chamber, whether it be cannular or annular. Additionally, it may be applicable to any structure that is desired to be cooled. For convenience, it is described in connection with a conventional combustion chamber structure. In such structure, the combustion chamber is generally made of concentric spaced panels (called liners in combustors) which are individually made up of rings 10 and 12 that are spaced from one another as shown in FIGURE 1. In order to separate the rings, an annular member 14 in the form of corrugations joined by risers 20 and known as a wiggle strip is provided that may be spot welded at 16 to the respective rings. The chamber is generally designed so that the inside surface of ring 10 is exposed to the hot exhaust gases shown by large arrow 17 and the outer ring 12 then tends to scoop or peel off the cooling fluid entering between the strip 14 as shown by arrow 18. It will be apparent that such a construction, results in alternate long cool-hot-warm spots on ring 12 as shown. A typical plot of the uneven temperature distribution is shown at 22. Consequently, the rings are subjected to severe thermal stresses across the surface of the ring 12 as shown in FIGURE 1 as well as at each end. As better shown in FIGURE 2, the conventional construction of inner ring 10, wiggle strip 14, and outer ring 12 results in a step 24 which causes the entering cooling fluid 18 to miss adhering as a cooling film to ring 12 for some distance downstream of the end of strip 14. As a result, a warm spot as shown in FIGURE 1 is present. Additionally, the hot gas 17 tends to blow away the cooling fluid and prevent its adherence satisfactorily to ring 12. As a result, the uneven temperature distribution shown on FIGURE 1 occurs over a long axial distance. It is to be noted that the thickness of strip 14 is a substantial portion of the opening between rings 10 and 12 which compounds the poor results noted above due to the large step 24.

Referring next to FIGURE 3, the construction of the present invention is shown in the same environment. This structure employs an inner ring 26 that is exposed to the hot gases and a spaced outer ring 28 this is exposed to the cooling fluid. It should be noted that the rings are generally made up of overlapping formations and the members 26 and 28 may be considered to be individual overlapping rings in a cylindrical configuration, concentrically and radially spaced from one another as shown. In order to provide the securement necessary and the radial spacing to form a cooling flow annulus, a separating means in the form of a different corrugated strip 32 is provided. This is disposed to extend around the rings in the overlap portion to form a cooling fluid flow passage 30 between the rings. The corrugated strip alternately contacts and is secured by spot welds 34 to the adjacent rings. As before, cooling air passes by way of arrow 36 between the rings and the hot gas passes by arrow 38 over the inner face of ring 26. For convenience of manufacture and assembly, the corrugations in strip 32 may be substantially flat between connecting risers 40 for attachment of adjoinings rings.

In order to obtain the substantially uniform temperature distribution across the rings and lengthwise thereof, a number of features are employed. To make use of the same quantity of available air and yet do it more effectively, the corrugated strip is provided with metering means such as crimps 42 in the surface of the corrugation between the risers. Each metering crimp extends toward the adjacent ring so that the cross sectional flow passage between the rings is reduced. This structure is more clearly shown in FIGURE 4 where it is to be noted that the overall height of the two rings is significantly greater than the conventional construction shown in FIGURE 2 to provide more rigidity and use the same quantity of air as will become apparent. By reducing the cross sectional area of the flow passage by crimping means 42, which may occur at the end of the strip to save material as shown on the left side of FIGURE 4 or before the end as shown on the right side of FIGURE 4 which may be a stronger arrangement if needed, it is possible to meter a desired given quantity of air through the corrugations. Thus, the same quantity of air or cooling fluid may be handled but by virtue of the construction described and to be described it is handled more efficiently for better cooling. It is desired to have the cooling film adhere to the hot surface of ring 28. To achieve this, the ring that is exposed to the hot gases, ring 26, is extended downstream of the corrugated strip 32 to form a plenum 44 downstream of the strip. This plenum now is considerably larger in cross sectional area than the crimped cross sectional area. As a result, the cooling flow velocity is greatly reduced by diffusion in the plenum. This permits the cooling fluid to adhere to ring 28 to provide a protective cooling film on the ring. As a result, the velocity of the cooling fluid may be more nearly matched to that of the hot gases so that the hot gases do not tend to tear the cooling film from the surface which is to be protected. It has been found that a ratio of the plenum height to the metering height of 5 to 1 is the maximum. The result of this crimped-strip, overhanging plenum is that a large protected diffusion area is provided with lower cooling fluid velocity, it is possible to match the fluid streams and the film effectiveness is increased by the cooling film adhering to the surface of ring 28. Thus, the same amount of cooling fluid may be used, but, by metering and diffusing, it is used far more effectively.

The end view of the structure of FIGURE 4 may be seen more clearly in FIGURE 5 where the alternately directed crimping means 42 are clearly shown and the effectively reduced cross sectional area 46 is shown.

In order to permit radial expansion, it is preferred that the corrugations be connected by risers 40. These risers create a transition zone 41 as seen in FIGURE 6 which a hot wake as shown in FIGURE 1 between the warm and cool zones. This is overcome in the present invention by the provision of wake replenishment holes 48 that are disposed in the outer ring 28 next to the cool fluid. The holes are substantially the same cross sectional area as the cross sectional area of the risers in the aligned or downstream direction and are preferably disposed in the plenum. Further, the holes 48 are disposed downstream of the risers and adjacent to and aligned with the risers as clearly shown in FIGURE 6. The pressure difference across liner 28 causes cool air to flow as shown by arrows in FIGURE 3 to remove the hot wake.

Functionally, any suitable metering means equivalent to crimping means 42 may be employed. Preferably, for ease of manufacture, the crimping means 42 extends between the risers and is disposed forward and aft on alternate corrugations purely as a manufacturing expedient. The operation is identical and the crimping means merely need to be supplied in the strips extending toward the opposite ring as clearly shown in FIGURE 3.

The result of the structure described, the metering means, the overhang and plenum, and the wake replenishment holes, has, by test, resulted in a typical temperature plot 50 as shown in FIGURE 3. It is apparent that the result of the structure is to provide substantially uniform temperature distribution across the rings and axially or lengthwise thereof. As stated above, this results in the ability of the cooling structure to withstand higher temperatures and, importantly, much longer life because of the lack of thermal gradients.

While there has been shown a preferred form of the invention, obvious equivalent variations are possible in light of the above teachings. It is therefore to be understood that within the scope of the appended claims, the invention may be practiced otherwise than as specifically described, and the claims are intended to cover such equivalent variations.

We claim:

1. A cooling structure employing panels formed of overlapping rings with hot and cold fluids on opposite sides thereof,
   means in said overlap spacing said rings from one another to form a fluid passage therebetween,
   said means comprising a corrugated strip alternately secured to said rings,
   metering means extending from said strip to reduce the cross sectional area of said fluid passage,
   one of said rings extending downstream of said strip to form a plenum with the other ring whereby fluid flow through said passage is metered and diffused to provide substantially uniform temperature distribution on said rings.

2. Apparatus as described in claim 1 wherein said corrugated strip includes risers between said securements and said metering means extends from said strip between the risers.

3. Apparatus as described in claim 2 wherein said corrugations are substantially flat between said risers, and
   replenishment holes disposed in one of said rings adjacent and downstream of said risers and aligned therewith.

4. A combustion chamber employing a pair of spaced panels,
   each panel being formed of a plurality of overlapping rings for the passage of hot and cold fluids on opposite sides thereof,
   means in each overlap separating said rings to form a cooling fluid flow passage between the rings, said means comprising,
   a corrugated strip alternately contacting and secured to said rings,
   risers between said securements,
   a metering crimp in said strip between said rises and extending toward the adjacent ring to reduce the cross sectional flow passage between said rings,
   the ring exposed to hot fluid extending downstream of said strip to form a plenum with the adjacent ring larger in cross section than said crimped cross sectional area,
   whereby cooling fluid flow past said metering crimp is diffused in said plenum to provide substantially uniform temperature distribution on said rings.

5. Apparatus as described in claim 4 wherein said panels are radially spaced concentric panels of substantially circular cross section.

6. Apparatus as described in claim 4 wherein said corrugations are substantially flat between said risers, and
   replenishment holes disposed in said ring adjacent said cold fluid,
   said holes being disposed downstream of said risers and aligned therewith.

7. A cylindrical combustion chamber employing a plurality of successively telescoping overlapping concentric rings,
   each ring being separated from its adjacent ring at the overlap to form an annulus between the rings for the passage of cooling fluid into the interior of the chamber,
   means in said annulus for separting the rings comprising,
   a corrugated strip extending around said rings secured alternately to said rings and having risers between the securements,
   a metering crimp in said strip between the corrugations and extending toward the adjacent ring to reduce the cross sectional area for the passage of cooling fluid,
   the inner ring extending downstream of the strip to form a plenum with the adjacent ring that is larger in cross section than said crimped cross sectional area,
   whereby cooling fluid is diffused in said plenum for uniform temperature distribution on said rings, and
   wake replenishment holes disposed in the outer ring in the plenum downstream of and in alignment with said risers,
   the cross sectional area of said holes being substantially equal to the cross sectional area of said risers in the aligned direction.

8. Apparatus as described in claim 7 wherein said metering crimps are at alternate ends of said strip in adjacent corrugations.

References Cited by the Examiner

UNITED STATES PATENTS 2,801,520  8/1957  Highberg _____ 60—39.65 X

FOREIGN PATENTS 335,303  12/1958  Switzerland.

MARK NEWMAN, *Primary Examiner.*

R. D. BLAKESLEE, *Assistant Examiner.*